United States Patent [19]
Kobayashi

[11] Patent Number: 5,312,301
[45] Date of Patent: May 17, 1994

[54] BICYCLE FRONT DERAILLEUR
[75] Inventor: Jun Kobayashi, Minamikawachi, Japan
[73] Assignee: Maeda Industries, Ltd., Osaka, Japan
[21] Appl. No.: 980,212
[22] Filed: Nov. 23, 1992
[30] Foreign Application Priority Data
 Nov. 29, 1991 [JP] Japan .................................. 3-98775
[51] Int. Cl.⁵ ........................ B62M 9/16; F16H 7/18; F16H 61/00
[52] U.S. Cl. ...................................... 474/80; 474/82; 474/140
[58] Field of Search ...................... 474/80, 82, 140, 78
[56] References Cited
U.S. PATENT DOCUMENTS

| | | | |
|---|---|---|---|
| 3,960,025 | 6/1976 | Juy | 474/82 |
| 4,223,562 | 9/1980 | Nagano et al. | 474/82 |
| 4,551,121 | 11/1985 | Nagano | 474/140 |
| 4,617,006 | 10/1986 | Nagano | 474/82 X |

FOREIGN PATENT DOCUMENTS

3411874 10/1984 Fed. Rep. of Germany ......... B62M 9/16

Primary Examiner—Douglas D. Watts
Attorney, Agent, or Firm—Michael D. Bednarek

[57] ABSTRACT

The present invention provides a bicycle front derailleur comprising: a movable member including an inner and outer guide plates opposed to each other to define a guide space through which a chain runs; the movable member being moved laterally of a bicycle for shifting the chain. For a purpose of preventing the chain from being caught or damaged by a chain entering edge of the movable member, a following techincal measure is employed: The movable member is provided with catch preventive measure for preventing the chain from being caught by the cain entering edge of the movable member when the chain enters the guide space between the inner and outer guide plates.

12 Claims, 10 Drawing Sheets

BICYCLE FRONT DERAILLEUR

BACKGROUND OF THE INVENTION

1. Field of the Invention

The present invention relates to a bicycle front derailleur. More specifically the present invention relates to a bicycle front derailleur wherein a chain will not be caught by a chain entering edge of a movable member when the chain is oscillated wildly in an upward direction.

2. Description of the Prior Art

Figure 13:
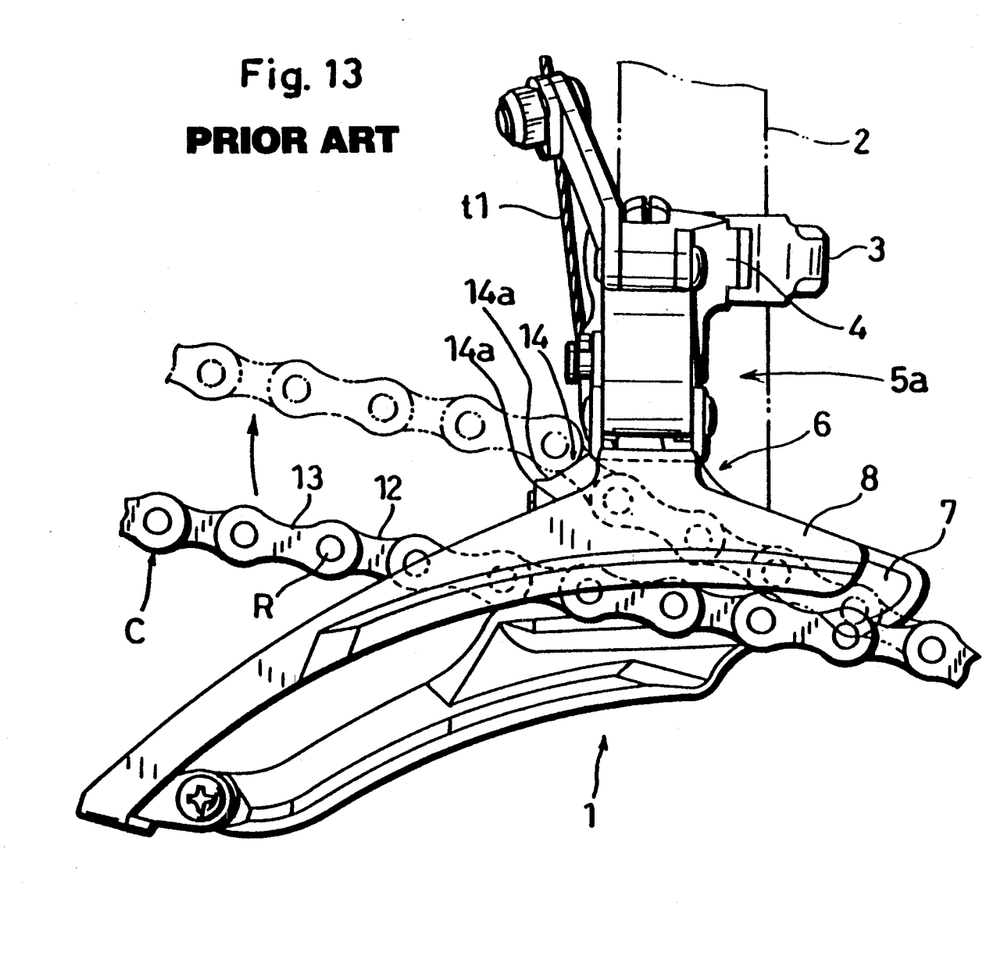
FIG. 13 is a side view showing a conventional bicycle front derailleur.
Figure 14:
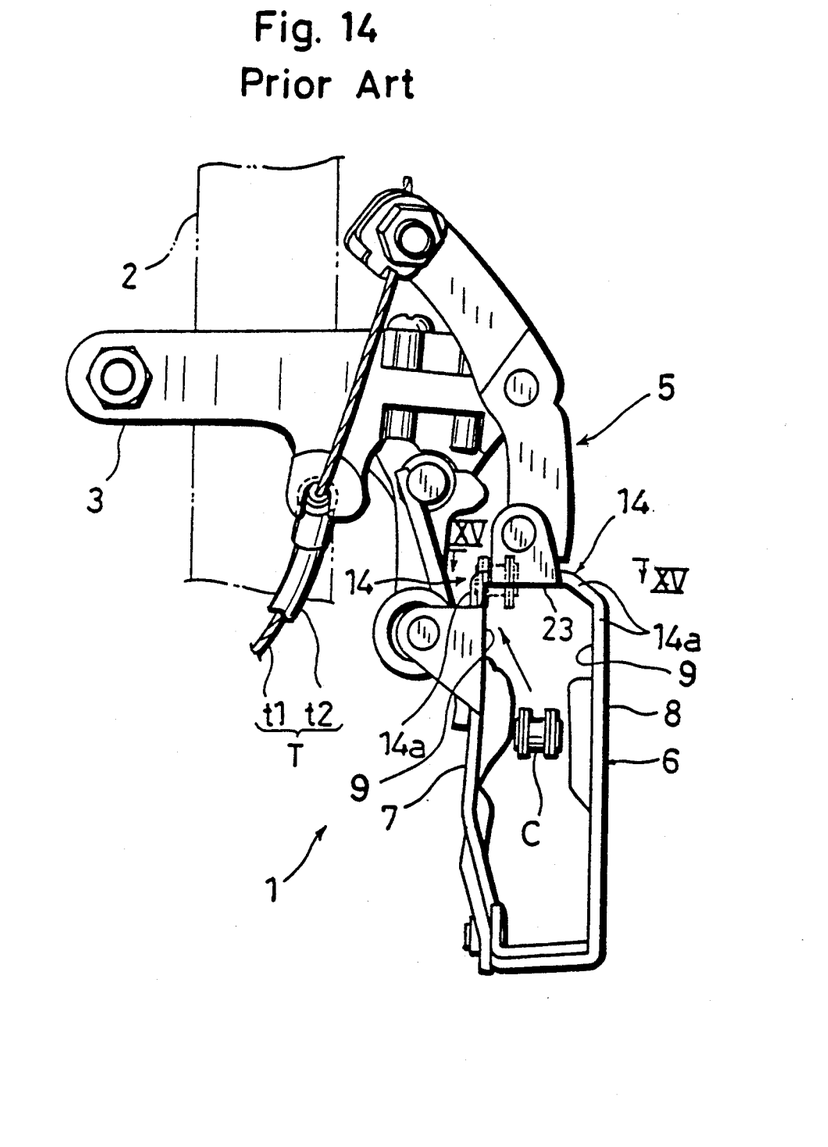
FIG. 14 is a rear view of the conventional bicycle front derailleur given in FIG. 13.
Figure 15:
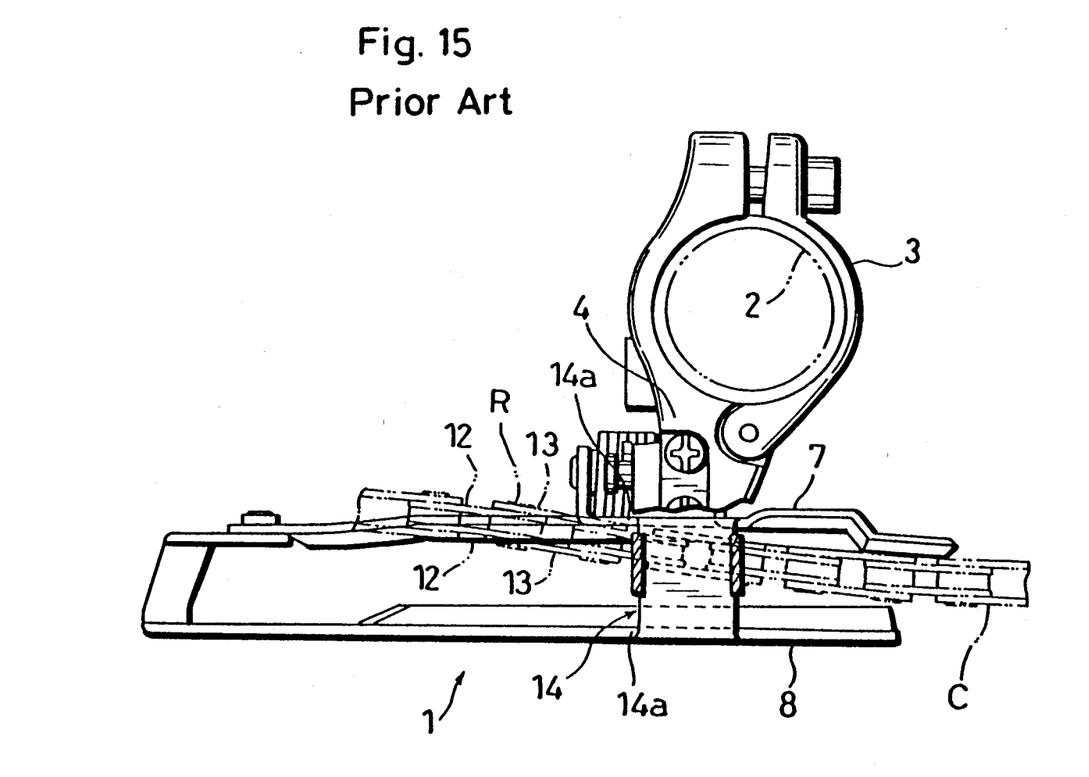
FIG. 15 is a cross-sectional view taken on the line XV—XV of FIG. 14.

A conventional bicycle derailleur comprises, a shown in FIGS. 13, 14 and 15, a base member 4 fixed at a lower portion of a seat pipe 2 by mounting means such as a mounting band 3, a shift link mechanism 5 such as a pantograph mechanism, a movable member 6 supported by the shift link mechianism 5. The movable member 6 connects inner and outer guide plates 7 and 8 opposed to each other at a predetermined spacing. The movable member can be moved laterally of a bicycle by the shift link mechianism 5.

In this type of front derailleur, when a chain C is to be shifted from a smaller-diameter sprocket which is placed inward laterally of a bicycle to a greater-diameter sprocket which is placed outward laterally of the bicycle, a control lever is operated. The control lever action is transmitted, via a control cable T which includes an inner cable t1 and an outer sheath t2, to the shift link mechanism 5, which shifts the inner and outer guide plates 7, 8 outward laterally of the bicycle, causing an inner face 9 of the inner guide plate 7 to press the chain C outwardly to force a portion of the chain C to engage the greater-diameter sprocket adjacent to the sprocket presently engaged by the chain C. As the greater-diameter sprocket turns, the chain C is completely shifted to that greater-diameter sprocket.

On the other hand, to shift the chain C from an outward-located greater-diameter sprocket to an inward-located smaller-diameter sprocket, the shift link mechanism 5 is caused to move the pair of guide plates 7, 8 inward laterally of the bicycle. This causes an inner face 9 of the outer guide plate 8 to press the running chain C inwardly, forcing the chain C to move from the present sprocket down to the adjacent smaller-diameter sprocket.

As shown in FIG. 15, the chain C comprises alternating pairs of inner link plates 12 and outer link plates 13, and rollers R. Each of the rollers connect a pair of the inner link plates 12 opposed to each other at a predetermined spacing to an adjacent pair of the outer link plates 13 opposed to each other at a predetermined spacing. The chain C engages the sprocket in such a manner that spaces formed by each opposed pair of the inner link plates 12 and the outer link plates 13 are filled by teeth of a sprocket (not shown), whereas the rollers fit in spaces formed between the teeth of the sprocket. With this constitution, the chain C has different dimensions in its width, i.e. one represented by a distance between an opposed pair of the inner link plates, and another represented by a distance between an opposed pair of the outer link plates, with resulting step portions formed by a thickness of the outer link plate at areas where an outer link plate overlaps an adjacent inner link plate.

On the other hand, as shown in FIGS. 13 through 15, the movable member 6, which connects the inner and outer guide plates 7, 8, is often made integrally with the inner and outer guide plate 7, 8 by punching and pressing a thin plate of metal.

This type of conventional movable member 6 formed by punching and pressing methods is, as shown in FIG. 14, formed with a connecting portion 23 at its top portion, which integrally connects the pair of guide plates 7, 8 with a predetermined space therebetween, whereas a chain entering edge 14 of the movable member 6 is left as punched, with a cut plane 14a, without further machining. As a result, as shown by phantom lines in FIGS. 13 through 15, the chain is apt to be caught by the chain entering edge 14 at one of the step portions formed by the outer link plate 13.

Particularly, when a bicycle is running down on a steep hill of a rugged road condition, pedalling operation is sometimes stopped momentarily, leaving the chain C under no tension during that moment. This allows the chain C to be oscillated wildly in a vertical direction, sometimes with a portion of the chain C being whipped wildly upward so that an edge portion of the chain's outer link plate 13 rides on the chain entering edge 14 of the movable member 6, and is caught by it.

When the pedalling is resumed to tension the chain C, with the portion thereof still remain caught by the movable member, the chain C pulls the movable member 6, which is very likely to cause damage to the entire front derailleur.

In addition, the cut plane 14a of the the inner and outer guide plates 7, 8, which is part of the chain entering edge 14 is left as punched as mentioned hereinabove and therefore, is very sharp. As a result, the chain C may be damaged when it hits or contacts the cut plate 14a.

SUMMARY OF THE INVENTION

It is therefore an object of the present invention to provide a bicycle front derailleur wherein the chain is not caught or damaged by the chain entering edge of the movable member even when the chain is wildly oscillated.

The present invention provides a bicycle front derailleur comprising: a movable member including an inner and outer guide plates opposed to each other to define a guide space through which a chain runs, the movable member being moved laterally of a bicycle for shifting the chain; wherein the movable member is provided with catch preventive means for preventing the chain from being caught by a chain entering edge of the movable member when the chain enters the guide space between the inner and outer guide plates.

Other objects, features and advantages of the present invention will be fully understood from the following detailed description given with reference to the accompanying drawings.

DETAILED DESCRIPTION OF THE PREFERRED EMBODIMENTS

The present invention is now described in its embodiments referring to the accompanying FIGS. 1 through 12. It should be appreciated to note here that in these Figs., the same numbers and symbols are used for members equivalent with those used in the conventional bicycle front derailleur.

Figure 1:
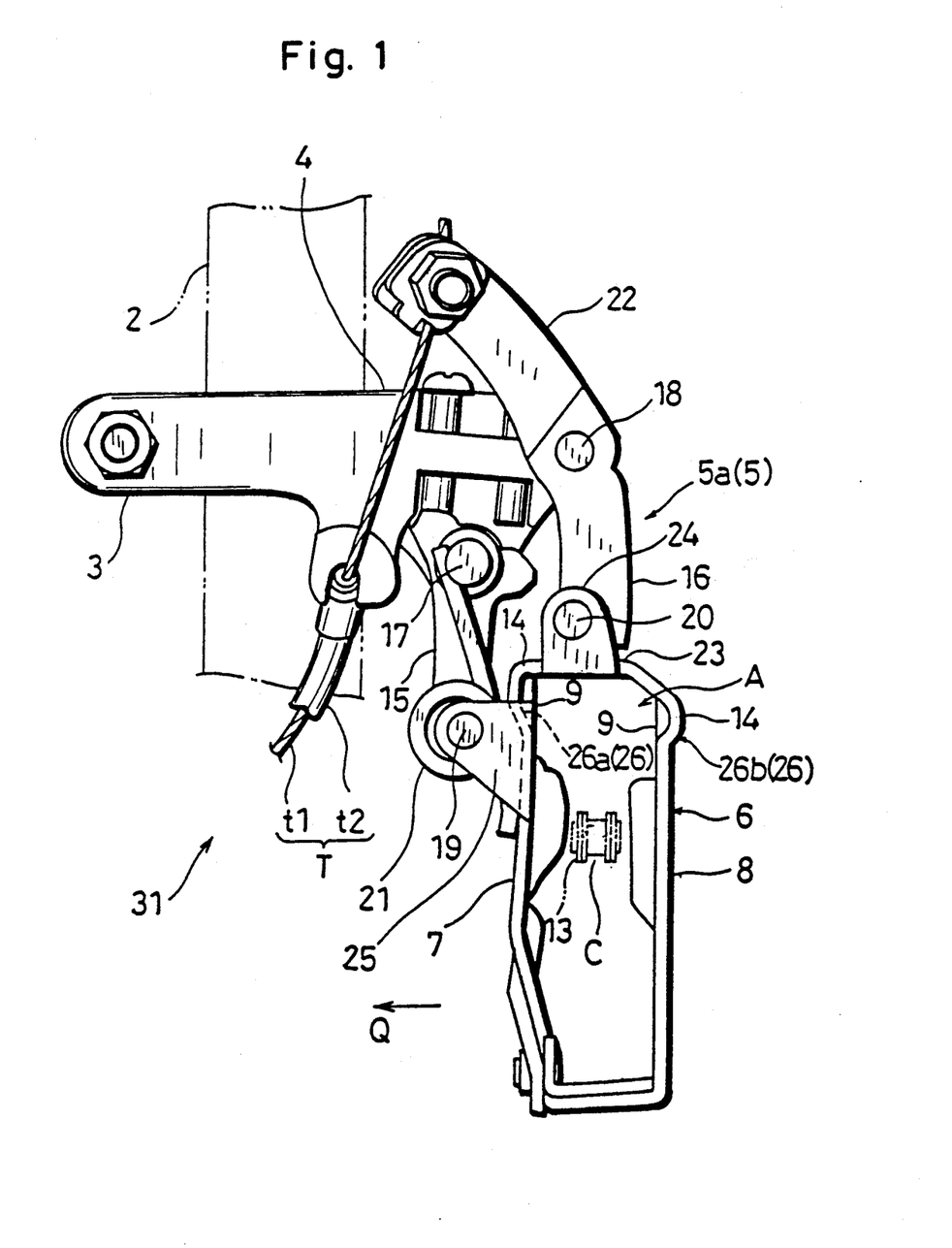
FIG. 1 is a rear view of a bicycle front derailleur according to an embodiment of the present invention.
Figure 2:
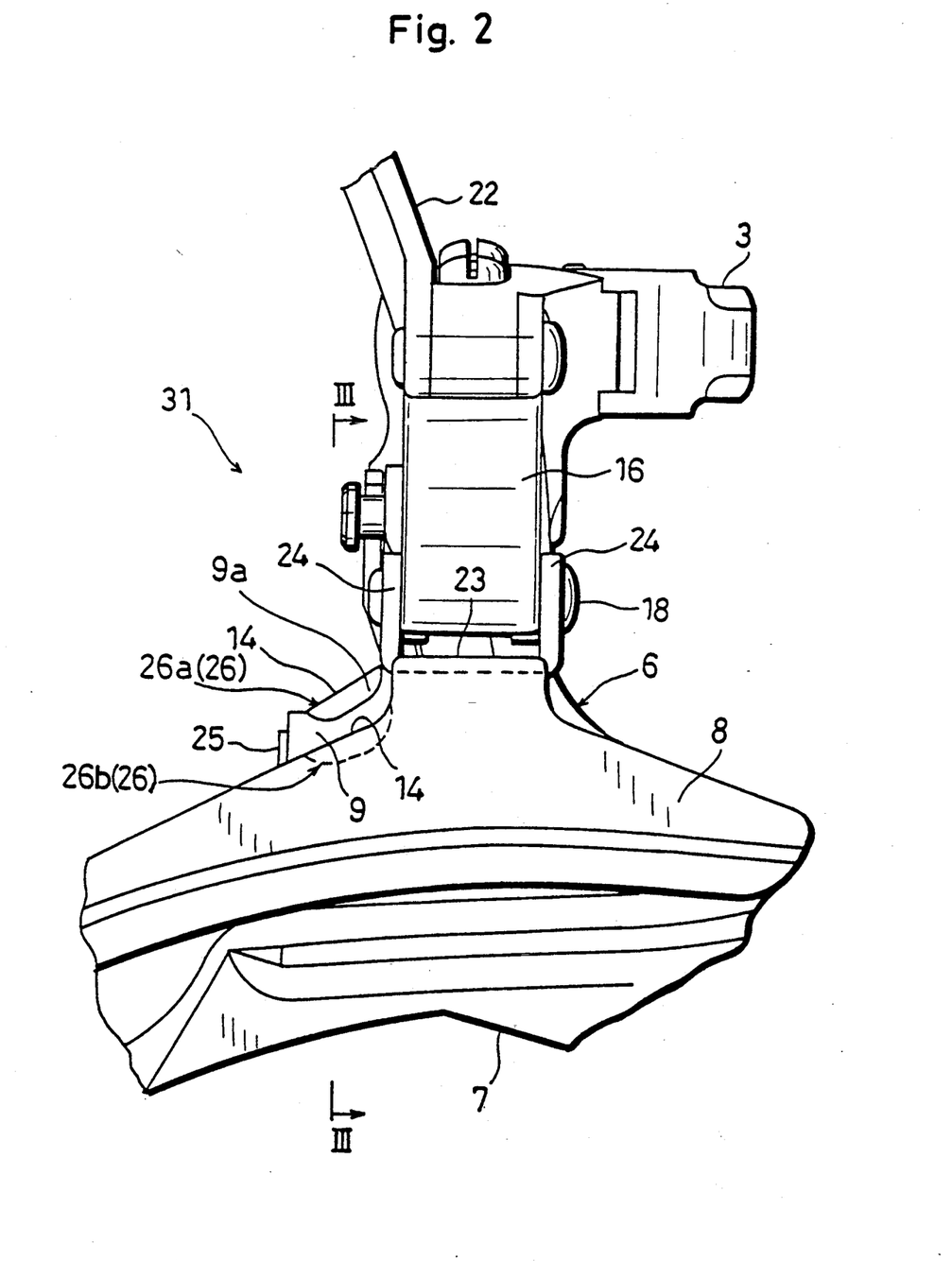
FIG. 2 is a side view of the bicycle front derailleur according to FIG. 1.
Figure 3:
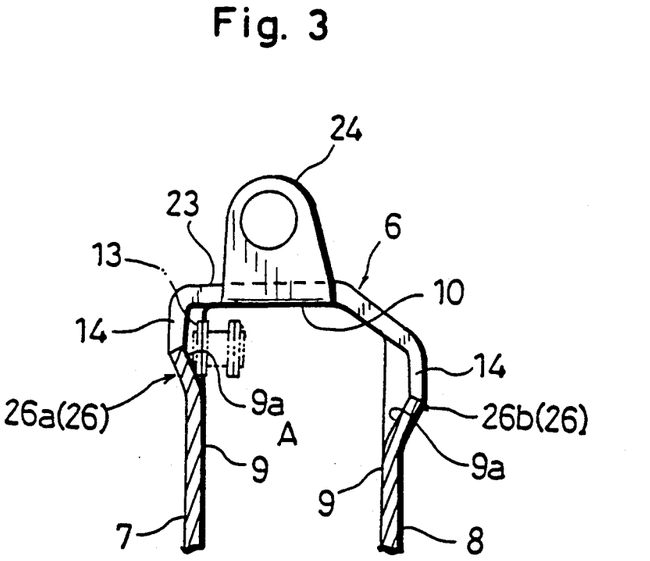
FIG. 3 is a cross-sectional view taken on the line III—III of FIG. 2.

Referring now to FIGS. 1 through 3, there is illustrated an embodiment of the present invention.

In this embodiment, a bicycle front derailleur 31 is configured in the same way as a conventional bicycle front derailleur, with a base member 4 fixed near a hanger rack at a lower portion of a seat pipe 2 by a mounting band 3. This base member 4 is linked, via a shift link mechanism 5 comprising a pantograph mechanism 5a, to a movable member 6.

The pantograph mechanism 5a is formed by pivotally connecting the base member 4 to respective upper ends of inner and outer link members 15, 16 with respective pins 17, 18, while connecting respective lower ends of the inner and outer link members 15, 16 to the movable member 6 with respective pins 19, 20. The pins 17, 18 which connect the base member 4 to the inner and outer link members 15, 16, and the pins 19, 20 which connect the movable member 6 to the inner and outer link members 15, 16 represent vertices of the parallelogram. Thus, when the inner and outer link members 15, 16 are pivoted against the base member 4, the movable member 6 is moved laterally of a bicycle while the movable member's orientation is kept unchanged. This parallelogram pantograph mechanism 5a is constantly urged by a coil spring 21 mounted around the pin 19 which connects the inner link member 15 to the movable member 6 so that the movable member 6 has a tendency to move inward laterally of the bicycle (the direction indicated by the arrow Q.) Above the outer link member 16, there is extended an operating arm 22 which is connected to an inner wire t1 of a control cable T, while an outer sheath t2 of the control cable T is fixed to the base member 4. To perform speed shift operation, the inner cable t1 is pulled against the outer sheath t2.

The movable member 6 includes inner and outer guide plates 7, 8 opposed to each other with a predetermined spacing and generally in parallel to a sprocket (not shown).

The movable member according to the present embodiment is made of a thin plate by punching and pressing methods, and as shown in FIGS. 1 through 3, is formed integrally with the inner and outer guide plates 7, 8. The movable member 6 according to the present embodiment has a connecting portion 23 at its upper portion that lies over the inner and outer guide plates 7, 8. This connecting portion 23 is formed with a pair of upright linking portions 24 made by a bending method for connecting to the outer link member 16, one of the pair being formed at a front end of the connecting portion 23, and the other of the pair being formed at a rear end thereof. There is another linking portion 25 formed integrally with the inner guide plate 7 by bending a portion of the inner guide plate inward laterally of the bicycle. The pins 19, 20 are respectively inserted through the linking portions 24, 25 to connect the movable member 6 to the inner and outer link member 15, 16.

The movable member 6 according to the present embodiment which includes the inner and outer guide plates 7, 8 has a chain entering edge 14 which includes portions left as punched, where catch preventive means 26a, 26b are provided for the chain C not to be caught by the chain entering edge 14.

The catch preventive means 26a, 26b according to the present embodiment are formed, as shown in FIGS. 1 through 3, by offsetting the chain entering edge 14 of the movable member away from a guide space A through which the chain runs. More specifically, upper portions of respective chain entering edges of the inner and outer guide plates 7, 8 are bent away from the guide space A: The upper portion of the chain entering edge of the inner guide plate 7 is bent inward laterally of the bicycle whereas the upper portion of the chain entering edge of the outer guide plate 8 is bent outward laterally thereof.

The provision of the catch preventive means 26a, 26b has avoids a situation such as shown by phantom lines in FIG. 3 wherein the chain C is caught by the chain entering edge 14 of the inner and outer guide plates 7, 8 when the chain C is wildly oscillated vertically during a rugged downhill riding to hit or contact the chain entering edge 14 of the movable member 6.

This also avoids a situation where the chain C is driven with part of the chain C stuck in the front derailleur 31, and thus, eliminates risk of damage to the front derailleur 31, resulting in highly improved safety of a bicycle in downhill riding for instance.

Another advantage of this particular catch preventive means 26a, 26b is that it includes a slanted face 9a located adjacent to the chain entering edge and inclined toward the guide space A through which the chain C runs. This slanted face 9a guides the chain C back to the guide space A even if the chain C hits the inner or outer guide plates 7, 8 or an upper portion of the movable member 6. In other words the slanted face 9a also protects the chain C from hitting or contacting the chain entering edge 14 and from being damaged.

FIGS. 4 through 9 show modifications of the catch preventive means 26 according to the present invention.

Figure 4:
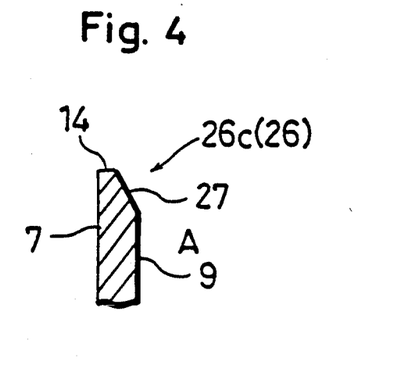
FIGS. 4 through 9 are cross-sectional views showing modifications of the catch preventive means according to the present invention, each cross-sectional view corresponding to the crosssection given in FIG. 3.
Figure 5:
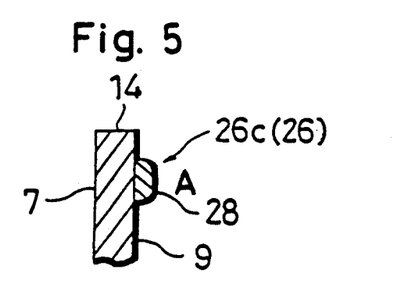
Figure 6:
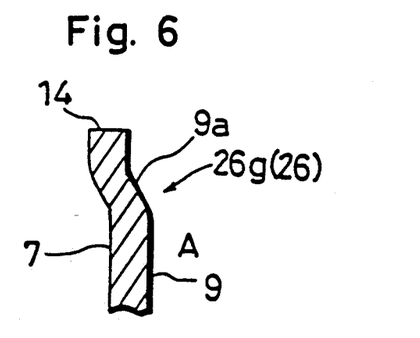
Figure 7:
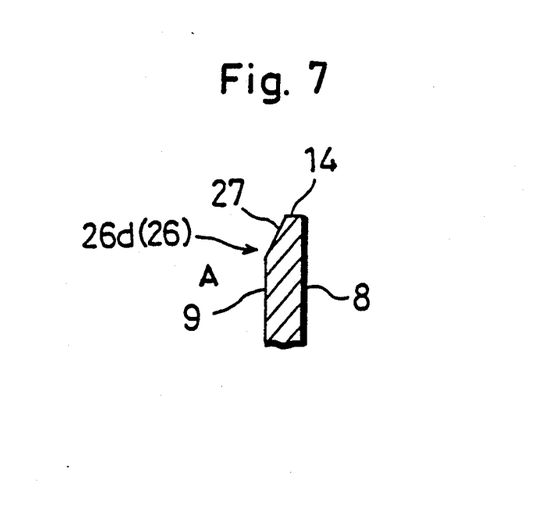
Figure 8:
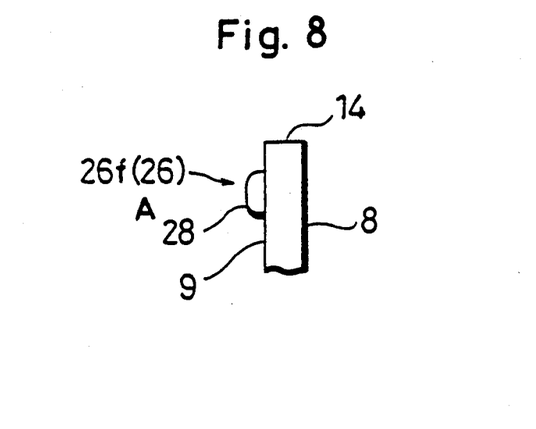
Figure 9:
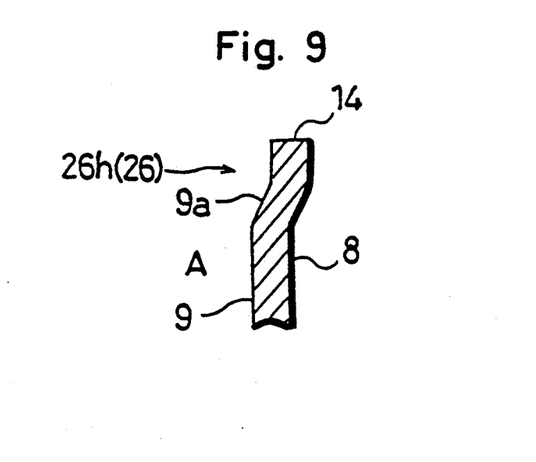

FIGS. 4 through 6 shows cross-sectional views of the catch preventive means 26 provided on the inner guide plate 7 whereas FIGS. 7 through 9 show cross-sectional views of the catch preventive means 26 provided on the outer guide plate 8. Each of the views corresponds to the cross section shown in FIG. 3.

Catch preventive means 26c, 26d shown respectively in FIGS. 4 and 7 are provided by forming chamfered portions 27 to make slanted faces 9a on the chain entering edges of the inner and outer guide plates 7, 8. Preferably, these chamfered portions 27 should be made by removing at least a half of a thickness of the respective guide plates.

The provision of the chamfered portions 27 has practically the same effect as offsetting of the chain entering edge away from the guide space A. Thus, the provision of the catch preventive means 26c, 26d avoids the situation wherein the chain C is caught by the chain entering edge 14 of the inner and outer guide plates 7, 8 when the chain C is wildly oscillated vertically during a rugged downhill riding to hit or contact the chain entering edge 14 of the inner and outer guide plates 7, 8.

Catch preventive means 26e, 26f shown respectively in FIGS. 5 and 8 are provided by forming projections 28 to prevent the chain C from contacting or hitting the chain entering edge 14 of the inner and outer guide plates 7, 8.

As shown in FIGS. 5 and 8, the projections 28 have an arcuate shape so that they do not catch the chain C. The provision of the projections 28 has practically narrowed the guide space A. Thus, the provision of the catch preventive means 26e, 26f prevents the chain C from contacting or hitting the chain entering edge 14 even if the chain C contacts or hits the inside face of the guide plates 7, 8. Hence the chain C is effectively protected from being caught by the chain entering edge 14.

Catch preventive means 26g, 26h shown respectively in FIGS. 6 and 9 are provided by forming stepped portions with transitive slant faces 9a to the guide space A. The provision of the catch preventive means 26g, 26h prevents the chain C from contacting or hitting the chain entering edge 14 with substantially the same function as achieved in the first embodiment described hereinabove.

Figure 10:
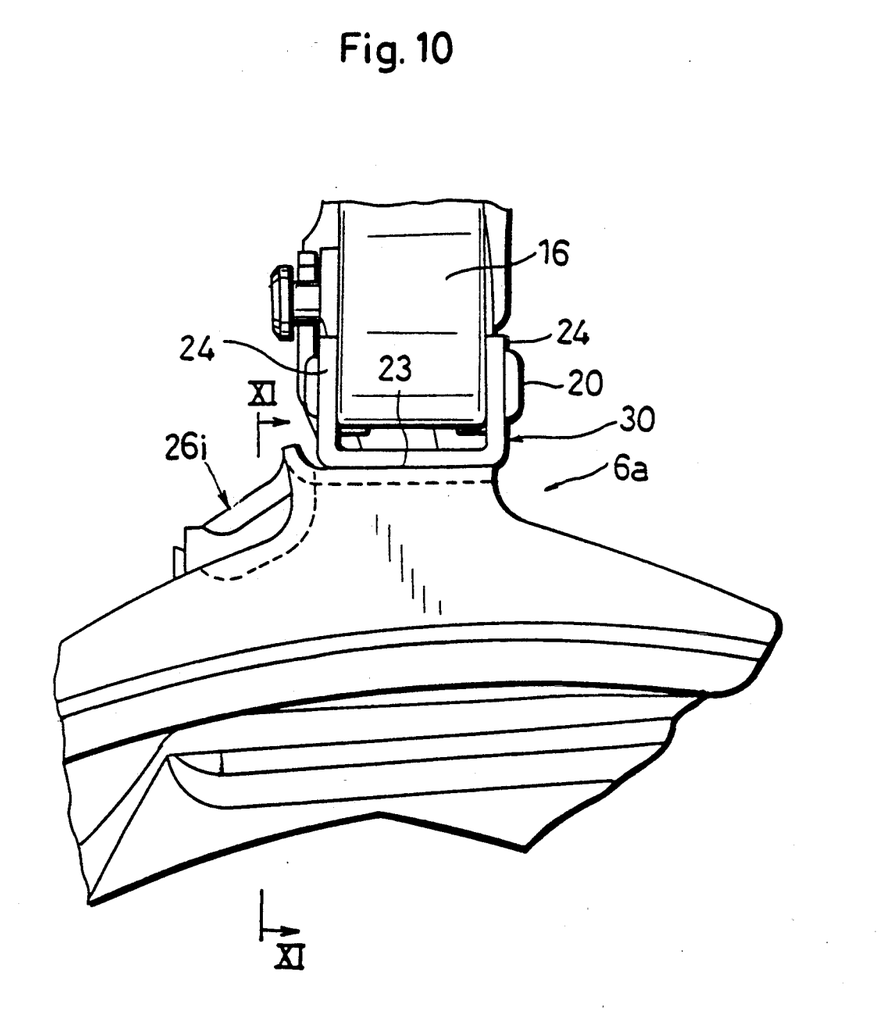
FIG. 10 shows another embodiment of the bicycle front derailleur according to the present invention.
Figure 11:
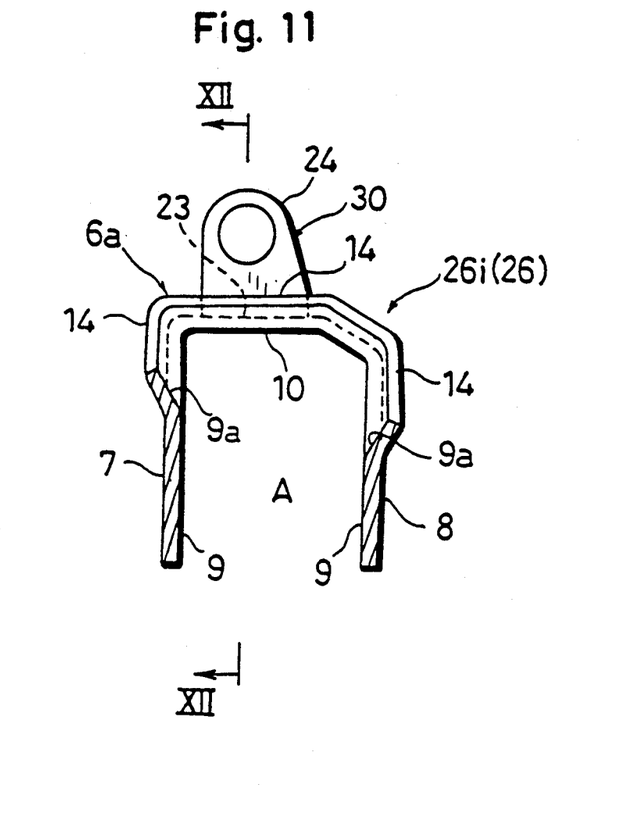
FIG. 11 is a cross-sectional view taken on the line XI—XI of FIG. 10.
Figure 12:
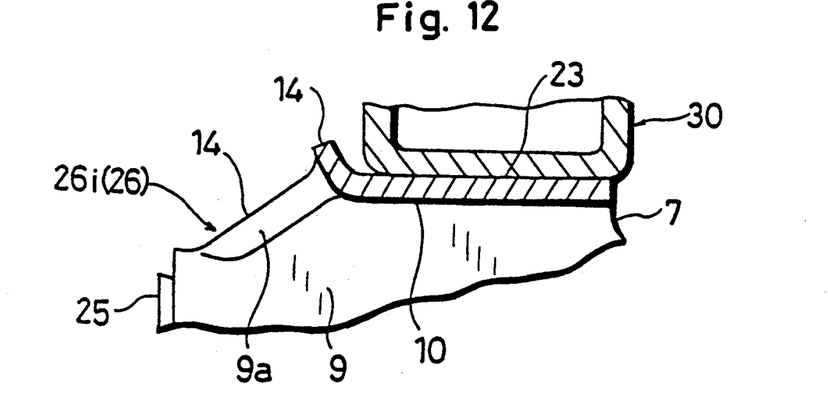
FIG. 12 is an enlarged cross-sectional view taken on the line XII—XII of FIG. 11.

FIGS. 10 through 12 show another embodiment of the present invention.

In this embodiment, the catch preventive means 26 is provided not only on both of the guide plates 7, 8 but also on the connecting portion 23 which connects the inner and outer guide plates 7, 8 opposingly at a predetermined spacing.

As shown in FIGS. 10 through 12, the movable member 6a according to this embodiment includes a generally U shaped connecting member 30 which has linking portions 24 integrally formed therewith for connecting to the outer link member 16. This connecting member 30 is made separately from the inner and outer guide plates 7, 8, and is welded to the connecting portion 23 which connects the inner and outer guide plates 7, 8 in a bridge-like manner.

Respective portions of the chain entering edge 14 of the inner and outer guide plate 7, 8 and the connecting portion 23 is bent away from the guide space A to form a catch preventive means 26i.

The provision of the catch preventive means 26i avoids a situation wherein the chain C is caught by the chain entering edge 14 of the inner and outer guide plates 7, 8 when the chain C is wildly oscillated vertically to hit or contact the chain entering edge 14 of the movable member 6.

The provision of the catch preventive means 26i also eliminates a situation in which the chain C is driven with part of the chain C stuck in the front derailleur 31, and thus, eliminates risk of damage to the front derailleur 31, with highly improved riding safety.

Further, since the catch preventive means 26i is also provided on the chain entering edge 14 of the connecting portion 23 which locates above the chain C, it is now possible to guide the chain C back to its normal running position even if the chain C contacts or hits the connecting portion 23, preventing effectively a case where the chain C is caught or damaged by the edge of the connecting portion 23.

The present invention being thus described, it is obvious that the same may be varied in many other ways, and the scope of the present invention should not be limited or confined to those described in the embodiments hereinabove.

For instance, the catch preventive means 26a, 26b provided respectively on the opposed inner and outer guide plates 7, 8 in the embodiment shown in FIGS. 1 through 3 may not always be provided in a pair, but instead, one of the inner and outer guide plates may be provided with the catch preventive means 26 as required. Likewise, in the embodiment shown in FIGS. 10 through 12, the inner and outer guide plate 7, 8 and the connecting portion 23 which connects the inner and outer guide plate 7, 8 are provided with the catch preventive means 26i extending continuously over their edges, but this catch preventive means may not be continuous and may be provided partially to cover portions of their edges.

Still further, the cross-sectional shape of the catch preventive means 26 shown in FIGS. 10 through 13 is not limited to those described in the embodiments, but other shapes of the catch preventive means such as the ones shown in FIGS. 4 through 9 may of course be used.

The embodiments uses a pantograph link mechanism for the shift link mechanism 5, but the present invention is also applicable to bicycle front derailleurs which use different types of the shift link mechanism.

I claim:

1. A combination of bicycle parts comprising a chain and a front derailleur, the chain assuming a plurality of normal positions and an abnormal position above all of the normal positions, the front derailleur comprising:

a movable member including inner and outer guide plates connected to each other by a top connecting portion and opposed to each other to define a guide space through which a chain runs, the movable member being moved laterally of a bicycle for shifting the chain; wherein the movable member is provided with catch preventive means located adjacent the top connecting portion for preventing the chain from being caught by a chain entering edge of the movable member when the chain enters the guide space at an abnormal position above the normal positions close to the top connecting portion.

2. The combination of bicycle parts of claim 1, wherein the catch preventive means is formed by offsetting the chain entering edge of the movable member away from the guide space.

3. The combination of bicycle parts of claim 2, wherein the chain entering edge of the movable member is rendered offset away from the guide space by bending of the chain entering edge.

4. The combination of bicycle parts of claim 2, wherein the chain entering edge of the movable member is rendered offset away from the guide space by forming a stepped portion.

5. The combination of bicycle parts of claim 1, wherein the catch preventive means is formed by chamfering the chain entering edge of the movable member.

6. The combination of bicycle parts of claim 5, wherein the chamfering is made by removing at least a half of a thickness of the movable member at the chain entering edge.

7. The combination of bicycle parts of claim 1, wherein the catch preventive means includes a slanted inner face which is located adjacent to the chain entering edge and inclined toward the guide space downwardly.

8. The combination of bicycle parts of claim 1, wherein the catch preventive means is a projection provided adjacent to the chain entering edge on an inner face of the movable member.

9. The combination of bicycle parts of claim 1, wherein the catch preventive means is formed on both of the inner and outer guide plates.

10. The combination of bicycle parts of claim 1, wherein the catch preventive means is formed only on one of the inner and outer guide plates.

11. The combination of bicycle parts of claim 1, wherein the catch preventive means is formed not only on both of the inner and outer guide plates but also on the top connecting portion which connects the inner and outer guide plates with a predetermined spacing inbetween.

12. A bicycle front derailleur comprising:
a movable member including inner and outer guide plates connected to each other by a top connecting portion and opposed to each other to define a guide space through which a chain runs, the movable member being moved laterally of a bicycle for shifting the chain;
the movable member being provided with catch preventive means located adjacent the top connecting portion for preventing the chain from being caught by a chain entering edge of the movable member when the chain enters the guide space; wherein the catch preventive means is formed not only on both of the inner and outer guide plates, but also on the connecting portion which connects the inner and outer guide plates with a predetermined spacing in between.

* * * * *